US009374613B2

(12) United States Patent
Maddali et al.

(10) Patent No.: US 9,374,613 B2
(45) Date of Patent: Jun. 21, 2016

(54) MEDIA CONTENT FLICKING SYSTEMS AND METHODS

(75) Inventors: Balamuralidhar Maddali, Virugambakkam (IN); T. Sahaya George, Kanyakumari District (IN); Madankanth Lanka, Visakhapatnam (IN); Abhishek Malhotra, Saharanpur (IN); Thalha Y. Refaye, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 726 days.

(21) Appl. No.: 13/313,666

(22) Filed: Dec. 7, 2011

(65) Prior Publication Data

US 2013/0151665 A1 Jun. 13, 2013

(51) Int. Cl.
| | |
|---|---|
| *G06F 15/16* | (2006.01) |
| *H04N 21/436* | (2011.01) |
| *H04L 29/08* | (2006.01) |
| *H04L 29/06* | (2006.01) |

(52) U.S. Cl.
CPC ........ *H04N 21/43615* (2013.01); *H04L 65/604* (2013.01); *H04L 67/16* (2013.01)

(58) Field of Classification Search
CPC .......... H04N 21/43615; H04N 21/436; H04N 21/435; H04N 21/43; H04N 21/4788; H04N 21/4786; H04L 65/604; H04L 65/605; H04L 65/602; H04L 65/601; H04L 65/60; H04L 65/00; H04L 65/607; H04L 65/608; H04L 67/16; H04L 67/14; H04L 67/00; H04L 67/02; H04L 67/025; H04L 29/06; H04L 29/04; H04L 29/02; H04L 29/00; H04L 69/12; H04L 69/16; H04L 69/161; H04L 69/164; H04L 69/329

USPC ........ 709/217, 218, 219, 223, 224, 230, 231, 709/232, 236, 237, 238, 245, 246, 247
See application file for complete search history.

(56) References Cited

U.S. PATENT DOCUMENTS

| | | | | |
|---|---|---|---|---|
| 5,809,512 | A * | 9/1998 | Kato ................. | G06F 17/30017 707/E17.01 |
| 7,228,189 | B1 * | 6/2007 | Gaddy et al. .................... | 700/94 |
| 7,548,948 | B2 * | 6/2009 | Klemets et al. ................ | 709/203 |
| 7,948,925 | B2 * | 5/2011 | Miyabayashi ...... | H04L 63/0492 370/295 |
| 8,401,681 | B2 * | 3/2013 | Rosenblatt ........ | G06F 17/30058 381/123 |
| 8,588,698 | B2 * | 11/2013 | Brisebois .............. | H04W 88/06 455/63.1 |
| 8,706,867 | B2 * | 4/2014 | Vijayan ............... | H04L 65/4084 707/999.102 |
| 2004/0004951 | A1 * | 1/2004 | Zuniga et al. ................. | 370/338 |
| 2006/0209892 | A1 * | 9/2006 | MacMullan et al. .......... | 370/468 |
| 2007/0019616 | A1 * | 1/2007 | Rantapuska ........ | H04L 12/1822 370/352 |
| 2007/0038516 | A1 * | 2/2007 | Apple et al. .................... | 705/14 |

(Continued)

*Primary Examiner* — Saket K Daftuar

(57) ABSTRACT

In an exemplary embodiment, a source media content processing device located at a customer premises 1) detects a user request to flick a media content instance from the source device to a destination media content processing device located at the customer premises and communicatively connected to the source device by way of a local area network ("LAN"), 2) in response to the detecting, hosts the media content instance at a resource address for access by way of the LAN and transmits the resource address to the destination device by way of the LAN, 3) receives, from the destination device by way of the LAN, a request to access the media content instance at the resource address, 4) and streams, to the destination device by way of the LAN in response to the request, data representative of the media content instance. Corresponding methods and systems are also disclosed.

22 Claims, 14 Drawing Sheets

(56) References Cited

U.S. PATENT DOCUMENTS

| | | | |
|---|---|---|---|
| 2007/0088801 A1* | 4/2007 | Levkovitz et al. | 709/217 |
| 2007/0235539 A1* | 10/2007 | Sevanto | G06K 7/10237 235/451 |
| 2008/0005195 A1* | 1/2008 | Li | G06F 17/30209 |
| 2008/0155057 A1* | 6/2008 | Khedouri | G06F 17/30038 709/217 |
| 2008/0250431 A1* | 10/2008 | Lee | G06F 17/301 719/328 |
| 2009/0001173 A1* | 1/2009 | Sevier et al. | 235/462.41 |
| 2009/0063699 A1* | 3/2009 | Chapweske et al. | 709/233 |
| 2009/0111378 A1* | 4/2009 | Sheynman | H04W 8/005 455/41.1 |
| 2009/0257416 A1* | 10/2009 | Walker | H04W 8/20 370/338 |
| 2009/0260060 A1* | 10/2009 | Smith et al. | 726/3 |
| 2009/0276547 A1* | 11/2009 | Rosenblatt | G06F 17/30058 710/33 |
| 2009/0282102 A1* | 11/2009 | Geurts | G06F 21/10 709/204 |
| 2009/0318114 A1* | 12/2009 | Bertoni | 455/410 |
| 2010/0081375 A1* | 4/2010 | Rosenblatt | G08C 17/02 455/41.1 |
| 2010/0081385 A1* | 4/2010 | Lin | H04M 1/7253 455/41.3 |
| 2010/0082491 A1* | 4/2010 | Rosenblatt | G06Q 10/02 705/65 |
| 2010/0082567 A1* | 4/2010 | Rosenblatt | G06F 17/30017 707/705 |
| 2010/0082784 A1* | 4/2010 | Rosenblatt | H04L 12/2812 709/222 |
| 2010/0138297 A1* | 6/2010 | Fitzgerald | G06F 21/88 705/14.53 |
| 2010/0274848 A1* | 10/2010 | Altmaier et al. | 709/203 |
| 2011/0066703 A1* | 3/2011 | Kaplan et al. | 709/219 |
| 2011/0145870 A1* | 6/2011 | Ramaswami et al. | 725/98 |
| 2011/0239287 A1* | 9/2011 | Pak et al. | 726/10 |
| 2011/0268422 A1* | 11/2011 | Jeong et al. | 386/241 |
| 2011/0310247 A1* | 12/2011 | Rensin et al. | 348/143 |
| 2012/0066347 A1* | 3/2012 | Zhu et al. | 709/219 |
| 2012/0084454 A1* | 4/2012 | Lindquist et al. | 709/231 |
| 2012/0131609 A1* | 5/2012 | Fernandez Gutierrez et al. | 725/34 |
| 2012/0143729 A1* | 6/2012 | Qureshey et al. | 705/27.1 |
| 2012/0210225 A1* | 8/2012 | McCoy et al. | 715/719 |
| 2012/0210241 A1* | 8/2012 | Wong et al. | 715/739 |
| 2012/0246191 A1* | 9/2012 | Xiong | 707/769 |
| 2012/0322368 A1* | 12/2012 | Desai | H04W 76/023 455/41.1 |
| 2013/0031275 A1* | 1/2013 | Hanes | G06F 3/0231 710/4 |
| 2013/0051772 A1* | 2/2013 | Ramaswamy et al. | 386/291 |
| 2013/0067068 A1* | 3/2013 | Hassan | H04W 76/02 709/224 |

* cited by examiner

MEDIA CONTENT FLICKING SYSTEMS AND METHODS

BACKGROUND INFORMATION

Consumer electronic devices are increasingly being used to access, store, download, play back, and/or otherwise process various types of media content (e.g., video, audio, photographs, and/or multimedia). In a typical scenario, a user may have multiple consumer electronic devices capable of processing media content (e.g., a mobile phone, tablet computer, personal computer, set-top box device, gaming console, etc.) at a common location (e.g., at a customer premises such as the user's home or office).

However, the user may experience limitations related to which of the user's consumer electronics devices may be used to access and experience specific media content from one or more sources of the media content. For example, the user may be limited to using a set-top box device to access and watch broadcast television content provided by a subscriber television service provider. The user may be further limited to using a different consumer electronic device to access and experience media content provided by an online media content storefront.

In addition, conventional implementations of consumer electronics devices have limited functionality when it comes to enabling a user operating one of the devices to share media content stored on or otherwise accessible by that device with other devices located at a common location. While technologies for local inter-device sharing of media content have begun to emerge, these existing technologies are difficult and/or inconvenient for a typical user to implement and/or use. The existing technologies are also prone to technical incompatibilities or other problems. A more elegant, user-friendly, convenient, efficient, and/or dependable solution is desired.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media content flicking systems and methods are disclosed herein. The exemplary systems and methods may allow media content to be flicked between consumer electronics devices located at a common physical location (e.g., at a customer premises) and communicatively interconnected to one another (e.g., by way of a local area network at the customer premises). As used herein, "flicking" of media content between locally interconnected devices refers to sharing (e.g., streaming, transferring, etc.) of media content from a source endpoint device to a destination endpoint device by way of a local area network in accordance with the principles described herein.

In an exemplary embodiment, a source media content processing device located at a customer premises 1) detects a user request to flick a media content instance from the source media content processing device to a destination media content processing device located at the customer premises and communicatively connected to the source media content processing device by a local area network at the customer premises, 2) in response to the detecting, hosts the media content instance at a resource address for access by way of the local area network and transmits data representative of the resource address to the destination media content processing device by way of the local area network, 3) receives, from the destination media content processing device by way of the local area network, a request to access the media content instance at the resource address, 4) and streams, to the destination media content processing device by way of the local area network in response to the request, data representative of the media content instance for processing by the destination media content processing device.

A user of locally inter-connected devices configured for flicking of media content by way of the local area network as described herein may provide input to cause media content stored on or otherwise accessible by a source device (e.g., a mobile consumer electronics device) to be flicked to a destination device (e.g., a set-top box device) such that the user may use the destination device to experience the media content. Accordingly, the user may use a device of choice to experience the media content. The flicking of media content from a source device to a destination device in accordance with the principles disclosed herein may provide for elegant, user-friendly, convenient, efficient, and/or dependable local inter-device sharing of media content. These and/or other benefits or advantages of the exemplary systems and methods will be made apparent herein.

Figure 1:
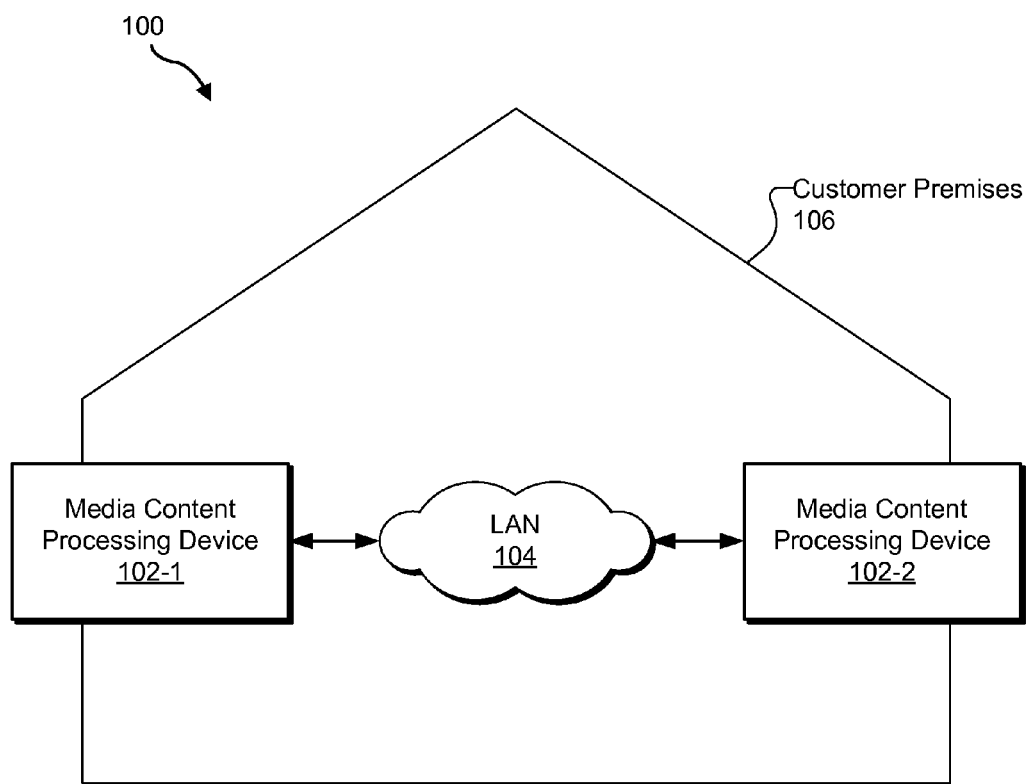
FIG. 1 illustrates an exemplary media content flicking system according to principles described herein.

FIG. 1 illustrates an exemplary media content flicking system 100 ("system 100"), which may include a plurality of media content processing devices 102 (e.g., media content processing devices 102-1 and 102-2) interconnected to one another by way of a local area network ("LAN") 104 at a customer premises 106. While FIG. 1 illustrates two media content processing devices 102-1 and 102-2 communicatively connected to LAN 104 at customer premises 106, this is illustrative only. Additional media content processing devices 102 may be connected to LAN 104 at customer premises 106 in other examples.

Customer premises 106 may include a physical premises associated with a user of media content processing devices 102. For example, customer premises 106 may include a home, office, school, or other building structure associated with the user.

LAN 104 may include any network that interconnects media content processing devices 102 within a limited local geographical area (e.g., at customer premises 106) and/or without the use of leased telecommunications lines. LAN 104 may utilize any suitable wired and/or wireless local network technologies, such as Wi-Fi and/or Ethernet technologies, to facilitate communications between multiple media content processing devices 102 interconnected by way of LAN 104. LAN 104 may include one or more network devices such as a router configured to provide LAN 104 and facilitate communications between media content processing devices 102 connected to LAN 102.

A media content processing device 102 may include any consumer electronics device that may be physically located at customer premises 106, may connect to LAN 104, and may process media content. Examples of a media content processing device 102 may include, without, limitation, a personal computer, a mobile phone, a smart phone, a tablet computer, a set-top box device, a digital video recorder ("DVR") device, a gaming device, a portable media player device, a mobile computing device, and any other computing device configured to process media content and connect to LAN 104.

Figure 2:
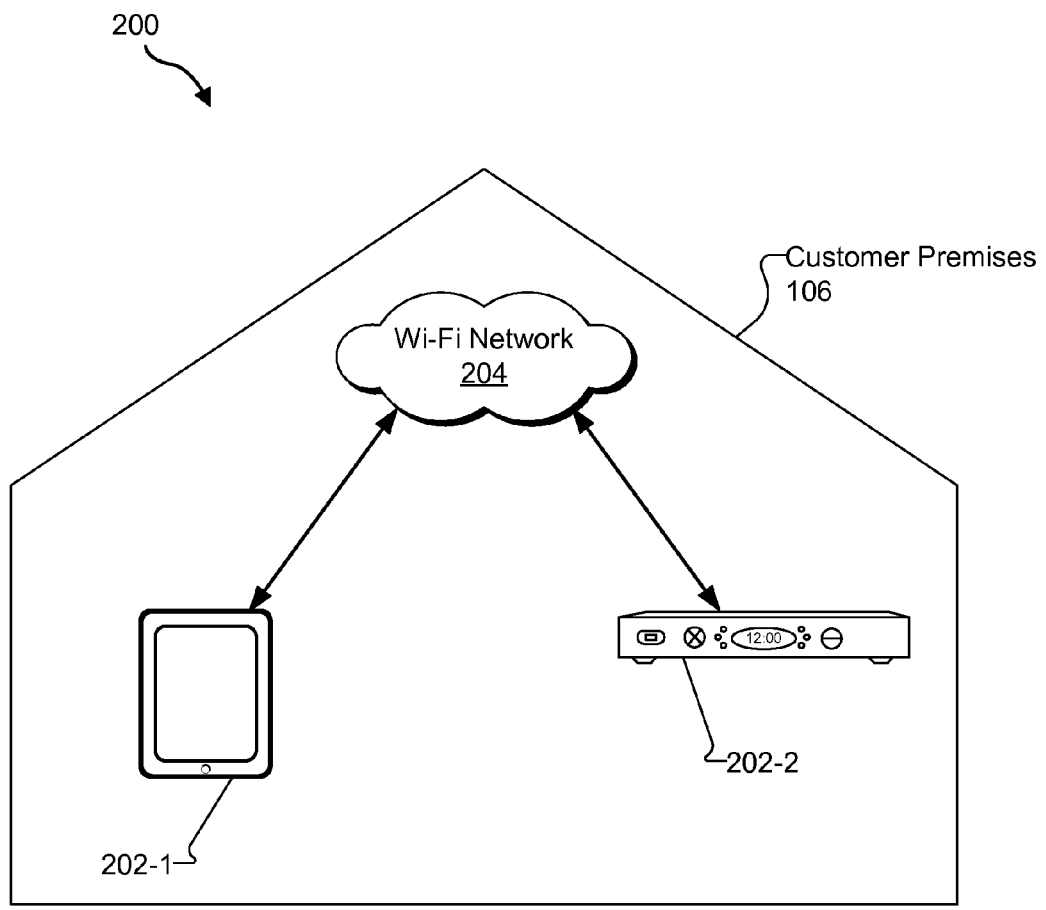
FIG. 2 illustrates an exemplary implementation of the system of FIG. 1 according to principles described herein.

In certain embodiments, media content processing devices 102 connected to LAN 104 may be heterogeneous in that the devices may include different types of devices that may have different capabilities related to processing media content. A type of media content processing device may refer to a particular make, model, computing platform (e.g., operating system platform), form factor, data connection (e.g., wireless or wireline data connection), media content processing capability, and/or any other attribute by which media content processing devices may be distinguished by type one from another. FIG. 2 illustrates an exemplary implementation 200 of system 100 in which a mobile computing device such as a tablet computing device 202-1 and a set-top box device 202-2 are connected to a LAN in the form of a Wi-Fi network 204 at customer premises 106 (e.g., a home Wi-Fi network).

Figure 3:
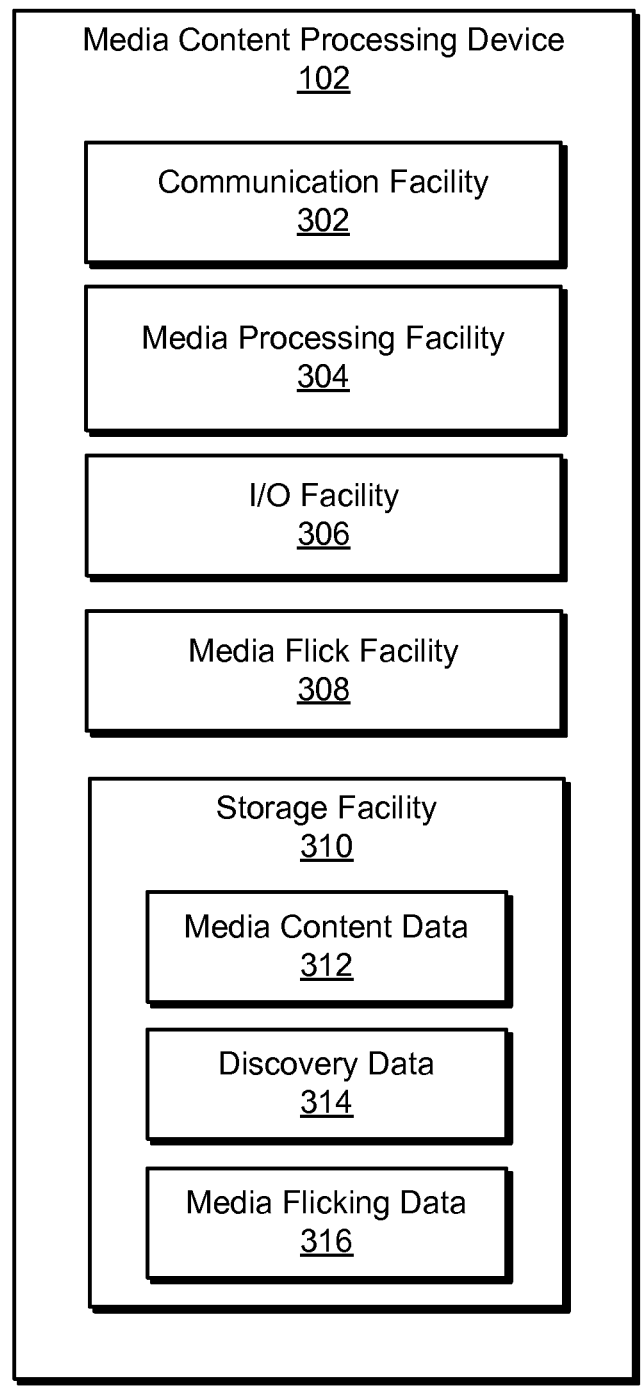
FIG. 3 illustrates exemplary components of a media content processing device according to principles described herein.

Exemplary components of a media content processing device 102 are illustrated in FIG. 3. As shown, media content processing device 102 may include a communication facility 302, a media processing facility 304, an input/output ("I/O") facility 306, a media flick facility 308, and a storage facility 310. It will be recognized that although facilities 302-310 are shown to be separate facilities in FIG. 3, any of facilities 302-310 may be combined into fewer facilities, such as into a single facility, or divided into more facilities as may serve a particular implementation. Any suitable communication technologies may be employed to facilitate communications between facilities 302-310.

Storage facility 310 may be configured to store data generated, maintained, and/or used by one or more of facilities 302-308. For example, storage facility 310 may store media content data 312 representing media content and/or media content metadata, discovery data 314 representing discovered media content processing devices 102 and/or capabilities of the discovered devices 102, and media flicking data 316, which may include any data associated with one or more of the media flicking operations described herein. Additional or alternative data may be stored in storage facility 310 in other examples.

Communication facility 302 may be configured to establish a connection with LAN 104 and to exchange communications and/or data over LAN 104 with one or more other media content processing devices 102 connected to LAN 104. Communication facility 302 may employ any communication and/or data transfer technologies suitable to support the communications and/or transfers of data between media content processing devices 102 described herein.

Media processing facility 304 may be configured to process media content, including presenting (e.g., displaying, playing back, etc.) media content for experiencing by a user of media content processing device 102. Media processing facility 304 may employ any suitable technologies for processing media content, including, without limitation, one or more video codecs, audio codecs, image viewers, media players, etc.

Media content processed or being processed by media processing facility 304 may be stored as media content data 312 in storage facility 312. Media content data 312 may include data representative of actual media content and/or metadata representative of one or more attributes of the media content.

As used herein, "media content" may refer generally to any form(s) of media that may be accessed, stored, presented, and/or otherwise processed by a media content processing device. The term "media content instance" will be used herein to refer to any television program, on-demand media program, pay-per-view media program, broadcast media program (e.g., broadcast television program), multicast media program (e.g., multicast television program), narrowcast media program (e.g., narrowcast video-on-demand program), IPTV media content, advertisement (e.g., commercial), video, movie, song, image, photograph, sound, or any segment, component, or combination of these or other forms of media content that may be processed by a media content processing device.

I/O facility 306 may be configured to receive input from and provide output to a user of media content processing device 102. I/O facility 306 may employ any suitable input and/or output technologies for receiving any suitable form of user input from and/or providing any suitable form of user output to a user of media content processing device 102. Hence, through I/O facility 306, media content processing device 102 may receive any of the user input and/or provide any of the output (e.g., media content presentation signals) described herein.

Media flick facility 308 may be configured to perform and/or direct media content processing device 102 to perform any of the exemplary media flicking operations described herein. With media flick facility 308 implemented by media content processing device 102, media content processing device 102 may be configured to function as an endpoint in an endpoint-to-endpoint flicking of media content between two media content processing devices 102 interconnected by way of LAN 104. Media flick facility 308 may be configured to operate in a server mode to function as a server endpoint and/or to operate in a client mode to function as a client endpoint associated with a flicking of media content between two media content processing devices 102. Thus, media flick facility 308 may be configured to perform and/or direct media content processing device 102 to perform any of the server-side and/or client-side media flicking operations described herein. When performing server-side media flicking operations, media content processing device 102 may be referred to as a "source media content processing device" or "source device." When performing client-side media flicking operations, media content processing device 102 may be referred to as a "destination media content processing device" or "destination device."

Figure 4:
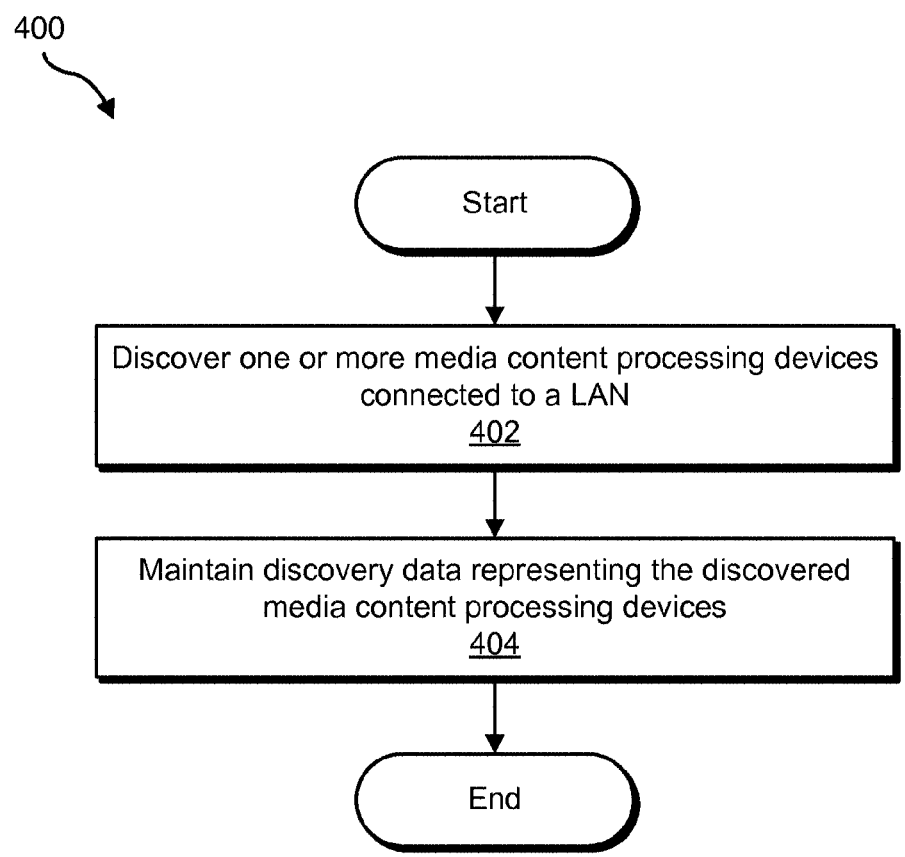
FIGS. 4-5 illustrate exemplary media content flicking methods according to principles described herein.
Figure 5:
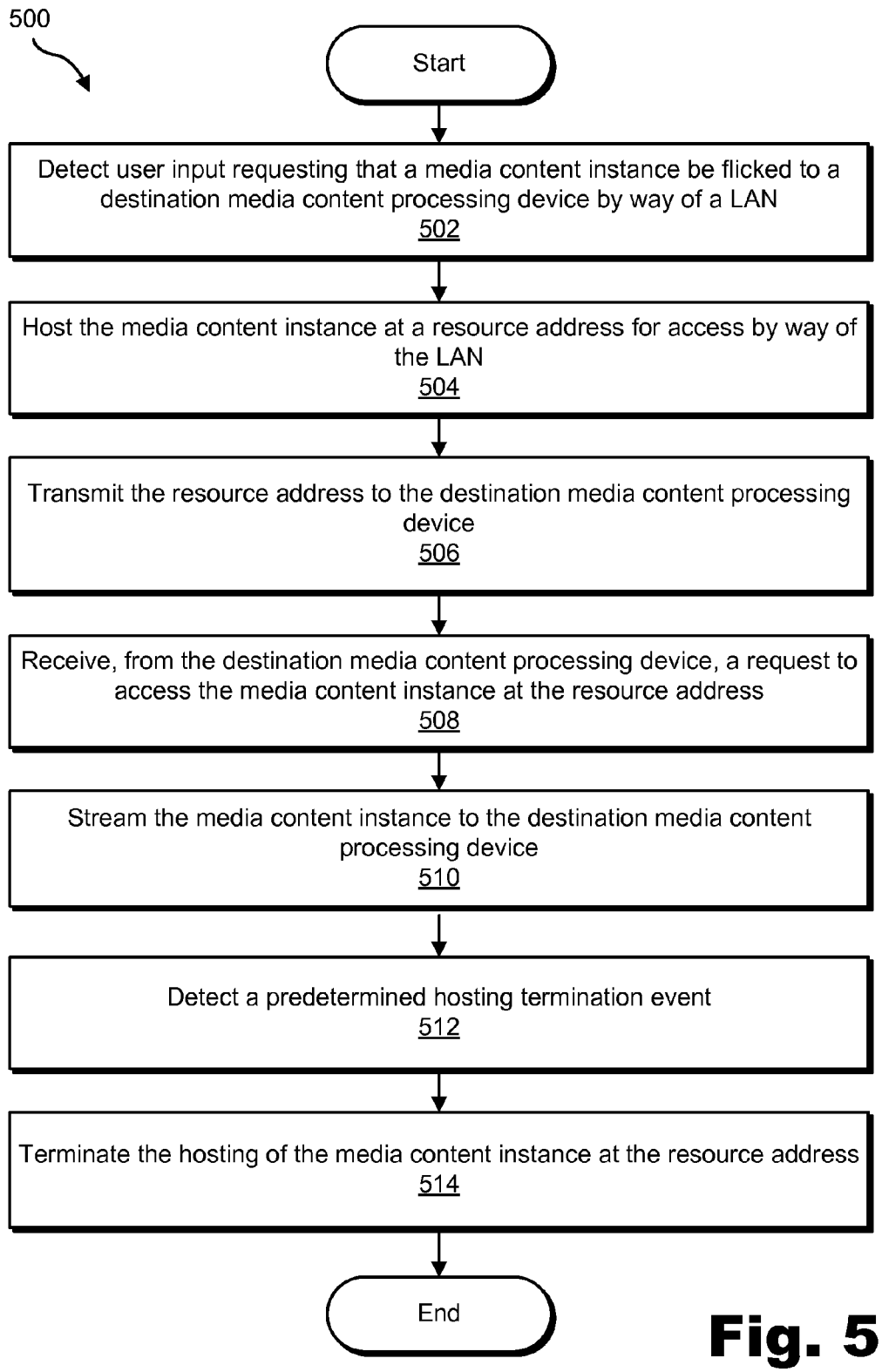

FIGS. 4-5 illustrate exemplary media flicking methods 400 and 500. While FIGS. 4-5 illustrate exemplary steps according to certain embodiment, other embodiments may omit, add to, reorder, combine, and/or modify any of the steps shown in FIGS. 4-5. The steps shown in FIGS. 4-5 may be performed by a media content processing device 102, and/or one or more components of the media content processing device 102, functioning as a source device.

Turning to FIG. 4, in step 402 of method 400, a source media content processing device discovers one or more other media content processing devices connected to LAN 104. For example, media flick facility 308 may be configured to direct the source media content processing device to request and receive device discovery data from any other media content processing devices that are connected to LAN 104 and that also implement media flick facility 308. For instance, media flick facility 308 may initiate a broadcast of a device discovery request message from the source media content processing device to all other devices connected to LAN 104. Any other media content processing devices that are connected to LAN 104 and that implement media flick facility 308 may receive, process, and respond to the discovery data request message. Accordingly, media flick facility 308 implemented by the source media content processing device may receive device discovery data from each of the other media content processing devices that implement media flick facility 308 and that are connected to LAN 104.

In step 404, the source media content processing device maintains discovery data representing the other media content processing devices connected to LAN 104. For example, media flick facility 308 may store the discovery data received in step 402 as discovery data 314 in storage facility 310.

In certain embodiments, discovery data 314 may specify one or more media content processing capabilities of the other media content processing devices connected to LAN 104. For example, discovery data 314 may specify one or more video codecs, audio codecs, image viewers, media players, and/or any other media content processing tools employed by the other media content processing devices. Additionally or alternatively, discovery data 314 may specify one or more media content data formats, types of media content, transport protocols, encoding and/or decoding information, bit rates, and/or any other attributes of and/or associated with media content capable of being processed by the other media content processing devices. Accordingly, is such embodiments, steps 402 and 404 may include discovering and maintaining device discovery data that represents one or more other media content processing devices connected to LAN 104 and one or more media processing capabilities of the other media content processing devices.

Turning to FIG. 5, in step 502 of method 500, the source media content processing device detects a user request to flick a media content instance from the source media content processing device to a destination media content processing device by way of LAN 104. The user request to flick the media content instance may be detected in any suitable way. For example, a user of the source media content processing device may provide user input indicating that the user wants to flick the media content instance from the source media content processing device to another media content processing device connected to LAN 104.

Figure 6:
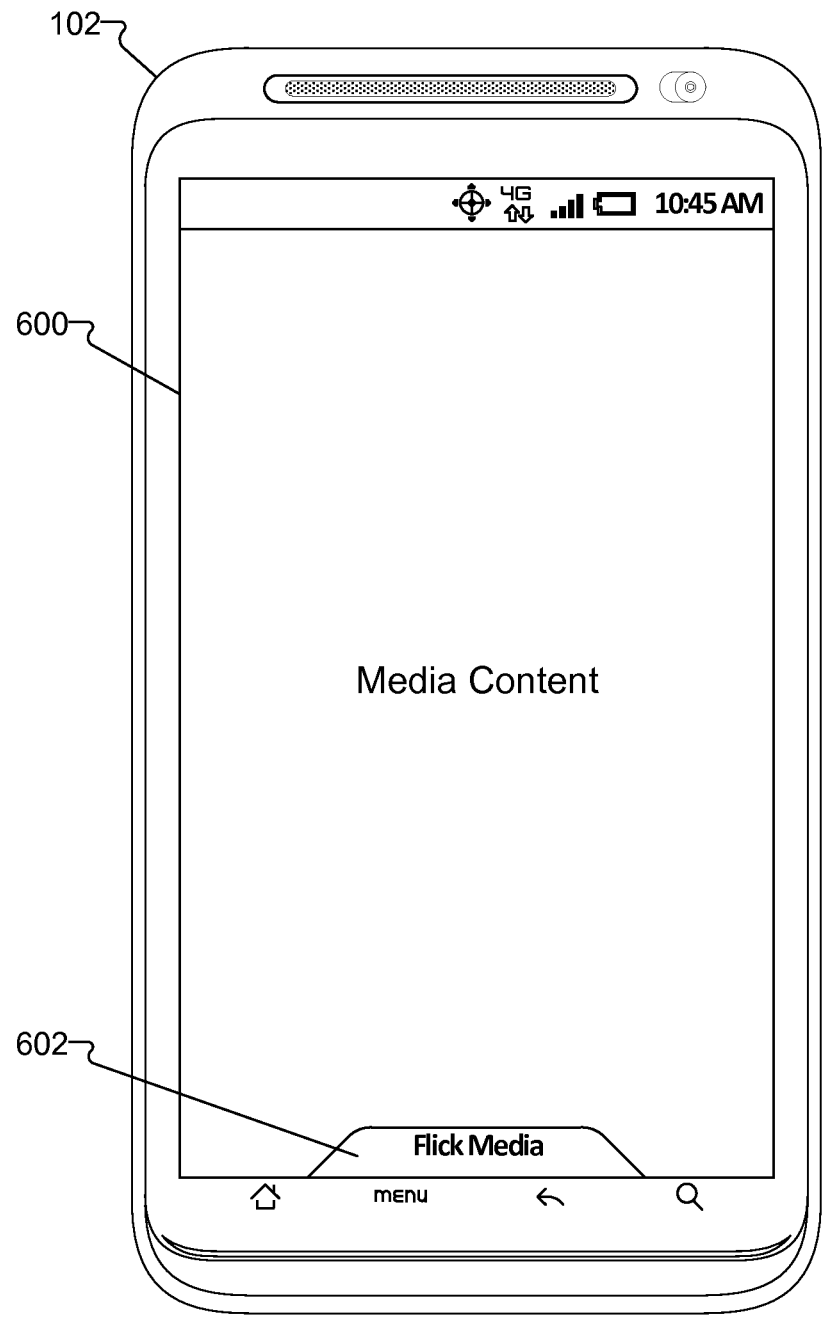
FIGS. 6-7 illustrate exemplary graphical user interface views associated with flicking media content according to principles described herein.

To illustrate, FIG. 6 shows a media content presentation graphical user interface ("GUI") 600 displayed on a display screen of a source media content processing device 102. A "flick media" tab 602 is displayed together with GUI 600 on the display screen. The user of the source media content processing device 102 may select tab 602 to indicate that the user wants to flick the media content instance associated with GUI 600 (e.g., the media content instance that is being presented within GUI 600 when tab 602 is selected) to another media content processing device connected to LAN 104.

Figure 7:
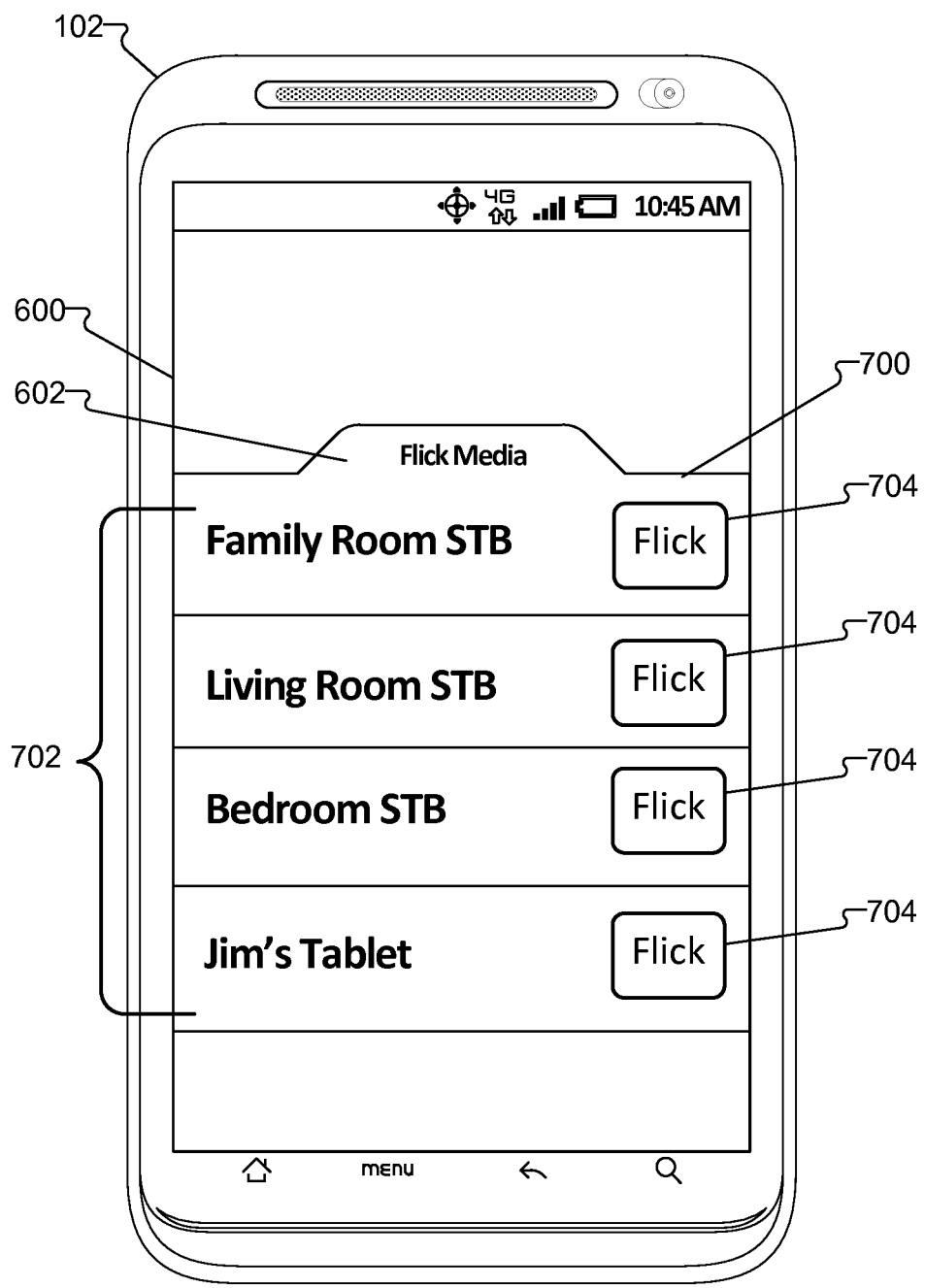

In response to the user selection of tab 602, the source media content processing device 102 may display a device menu GUI 700 on the display screen of the source media content processing device 102, such as is illustrated in FIG. 7. As shown, device menu GUI 700 may present a list 702 of device identifiers indicating one or more other media content processing devices that are connected to LAN 104. Media flick facility 308 implemented by the source media content processing device 102 may use discovery data 314 to identify and populate the list 702 of device identifiers included in GUI 700 with information about other media content processing devices that are currently connected to LAN 104. In the example illustrated in FIG. 7, the list 702 of device identifiers indicates four other media content processing devices—a set-top box device located in a family room of customer premises 106 ("family room STB"), a set-top box device located in a living room of customer premises 106 ("living room STB"), a set-top box device located in a bedroom of customer premises 106 ("bedroom STB"), and a tablet computer associated with a user named Jim ("Jim's tablet").

From the list 702 of device identifiers, the user may select one of the other media content processing devices to which the media content instance will be flicked. The selection may be made in any suitable way. For example, a selectable "flick" option 704 may be displayed next to each device identifier, and the user may select a desired "flick" option 704 to indicate a destination media content processing device to which the media content instance will be flicked.

The exemplary user interfaces illustrated in FIGS. 6-7 are illustrative only. Other user interfaces and/or forms of user input may be used in other embodiments to receive user input indicating that the user wants to flick a particular media content instance from the source media content processing device to a particular destination media content processing device.

Returning to FIG. 5, the source media content processing device performs steps 504 and 506 in response to the flick request detected in step 502. In step 504, the source media content processing device hosts the media content instance at a resource address for access by way of LAN 104. The media content instance may be hosted at the resource address in any suitable way that allows, in response to the flick request, the media content instance to be accessed over LAN 104 by another media content processing device 102 requesting access to the resource address.

In certain examples, media flick facility 308 implemented by the source media content processing device may be configured to function as a server (e.g., a media server, Hypertext Transfer Protocol ("HTTP") server, etc.) and may be configured to associate the media content instance with a particular resource address hosted by the source media content processing device such that the media content instance may be accessed over LAN 104 at the resource address.

Figure 8:
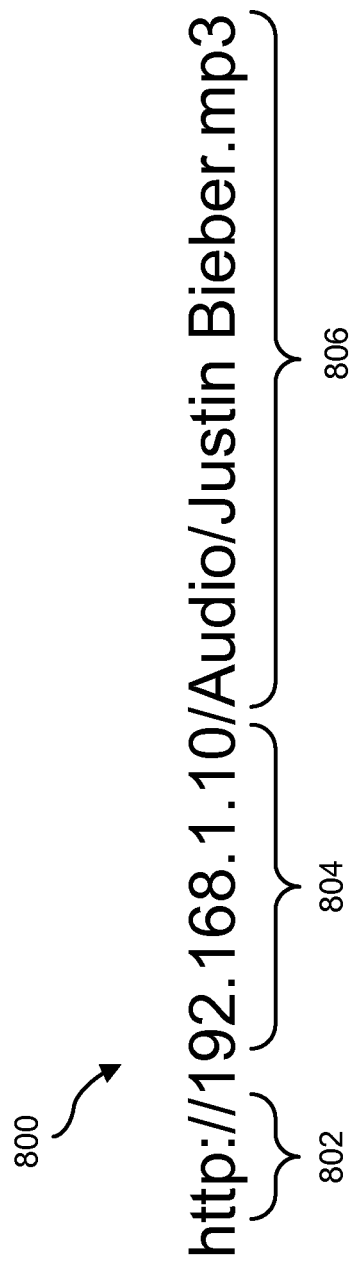
FIG. 8 illustrates an exemplary resource address at which a media content instance may be hosted by a source media content processing device according to principles described herein.

In certain exemplary embodiments, the resource address may comprise a Hypertext Transfer Protocol ("HTTP") Uniform Resource Locator ("URL") address. FIG. 8 illustrates an exemplary HTTP URL address 800 at which the media content instance may be hosted by the source media content processing device for access by way of LAN 104. HTTP URL address 800 may include a resource type section 802, a hostname section 804, and a resource pathname section 806. Resource type section 802 may include information indicating a type of the media content instance and/or a type of transfer technology to be used to flick the media content instance. In the illustrated example, resource type section 802 indicates that HTTP technology (e.g., HTTP streaming) will be used to flick the media content instance. Hostname section 804 indicates a network address of the source media content processing device within LAN 104. For example, hostname section 804 may indicate a private Internet Protocol ("IP") address of the source media content processing device within LAN 104. Resource pathname section 806 may indicate a path (e.g., a pathname) that may be used by another media content processing device connected to LAN 104 to access the media content instance hosted by the source media content processing device. For example, resource pathname section 806 may indicate a file pathname indicating a location at which a file or set of files storing the media content instance may be accessed.

In certain embodiments, step 504 may include the source media content processing device creating the resource address and/or exposing the resource address for access over LAN 104 and mapping the media content instance to the resource address. The mapping may be performed in any suitable way, such as by mapping the resource address to a file system location at which data representative of the media content instance is stored by the source media content processing device.

Returning again to FIG. 5, in step 506, the source media content processing device transmits data representative of the resource address to the destination media content processing device by way of LAN 104. The resource address may be transmitted to the destination media content processing device by way of LAN 104 in any suitable way. For example, media flick facility 308 may use discovery data 314 to identify a network address (e.g., a hostname, a private IP address, etc.) of the destination media content processing device on LAN 104 and then transmit the resource address to the identified address of the destination media content processing device.

In step 508, the source media content processing device receives, from the destination media content processing device, a request to access the media content instance at the resource address. For example, the destination media content processing device may receive the resource address from the source media content processing device and respond by generating and transmitting, to the source media content processing device by way of LAN 104, a request to access the media content instance at the resource address. The source media content processing device may receive the access request in step 508.

The access request may be in any suitable form and transmitted over LAN 104 using any suitable communications technologies. In certain embodiments, the access request may comprise an HTTP request to access content located at a particular HTTP URL, such as HTTP URL address 800.

In step 510, the source media content processing device streams the media content instance to the destination media content processing device by way of LAN 104. Step 510 may be performed in response to the access request received in step 508. Any suitable technologies may be used to stream the media content instance to the destination media content processing device by way of LAN 104. In certain embodiments, for example, HTTP streaming (e.g., HTTP live adaptive bit rate streaming) is used to stream the media content instance from the source media content processing device to the destination media content processing device by way of LAN 104 in step 510.

While the above description of step 510 is directed to streaming media content such that the destination media content processing device may present the media content instance as the streamed media content instance is received over LAN 104, this is illustrative only. Other embodiments may use other suitable data transfer technologies to transfer media content and/or other types of digital content from the source media content processing device to the destination media content processing device by way of LAN 104.

In certain embodiments, step 510 may include selecting a particular transfer technology and/or data transfer attribute (e.g., bit rate) to use to transfer a particular media content instance based on one or more attributes of the media content instance and/or one or more media processing capabilities of the destination media content processing device. In this and/or a similar manner, the source media content processing device may be configured to tailor, in step 510, the streaming of the data representative of the media content instance to the destination media content processing device based on at least one of the discovered media processing capabilities that is associated with the destination media content processing device.

During streaming of the media content instance from the source media content processing device to the destination media content processing device, the source media content processing device may be configured to listen for one or more user input control events from the destination media content processing device. For example, the source media content processing device may be configured to listen for and detect user input playback control commands (e.g., stop, play, pause, fast forward, rewind, skip forward, skip backward, and other trick play commands) provided by the destination media content processing device to control presentation of the streamed media content instance. The source media content processing device may be configured to adjust the streaming of the media content instance in response to such playback control commands.

In addition, the destination media content processing device may be configured to listen for events from the source media content processing device. For example, the destination media content processing device may listen for and detect playback commands provided by the source media content processing device to adjust playback of a media content instance in accordance with the user input control events provided by a user of the destination media content processing device and sent to the source media content processing device.

In step 512, the source media content processing device detects a predetermined hosting termination event. The predetermined hosting termination event may be in any suitable form and may be detected in any suitable way. Examples of the predetermined hosting termination event may include, without limitation, completion of the streaming of the media content instance in step 510, an interruption to the streaming of the media content instance in step 510 (e.g., a network connectivity interruption), the destination media content processing device terminating the streaming of the media content instance (e.g., the media content processing device sending a termination command in response to user input to terminate the streaming), the source media content processing device terminating the streaming of the media content instance (in response to user input to terminate the streaming), and any other event that has been predefined to trigger termination of hosting of the media content instance.

In step 514, the source media content processing device terminates the hosting of the media content instance at the resource address in response to the detection of the predetermined hosting termination event. The source media content processing device may terminate the hosting of the media content instance at the resource address any suitable way. For example, the source media content processing device may stop exposing and/or deactivate the resource address such that the resource address is no longer accessible by way of LAN 104. As another example, the source media content processing device may delete a mapping of the resource address to a file system address associated with the media content instance (e.g., a file system address at which the media content instance is stored by the source media content processing device) such that the media content instance is no longer accessible through the resource address.

By terminating the hosting of the media content instance at the resource, the source media content processing device may promote security of the hosting (by preventing the resource address and/or media content instance from remaining exposed). The termination of the hosting may also help conserve resources of the source media content processing device. The temporary nature of the hosting may help create and/or otherwise support a specific endpoint-to-endpoint flicking of media content as described herein.

Figure 9:
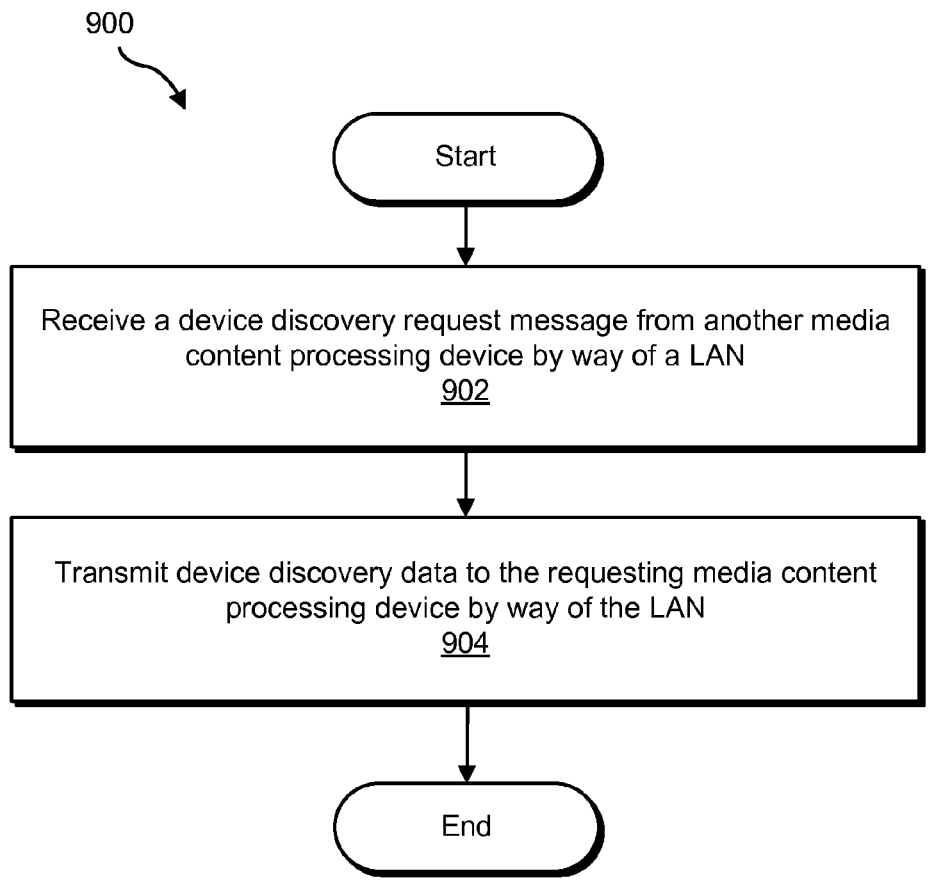
FIGS. 9-10 illustrate exemplary media content flicking methods according to principles described herein.
Figure 10:
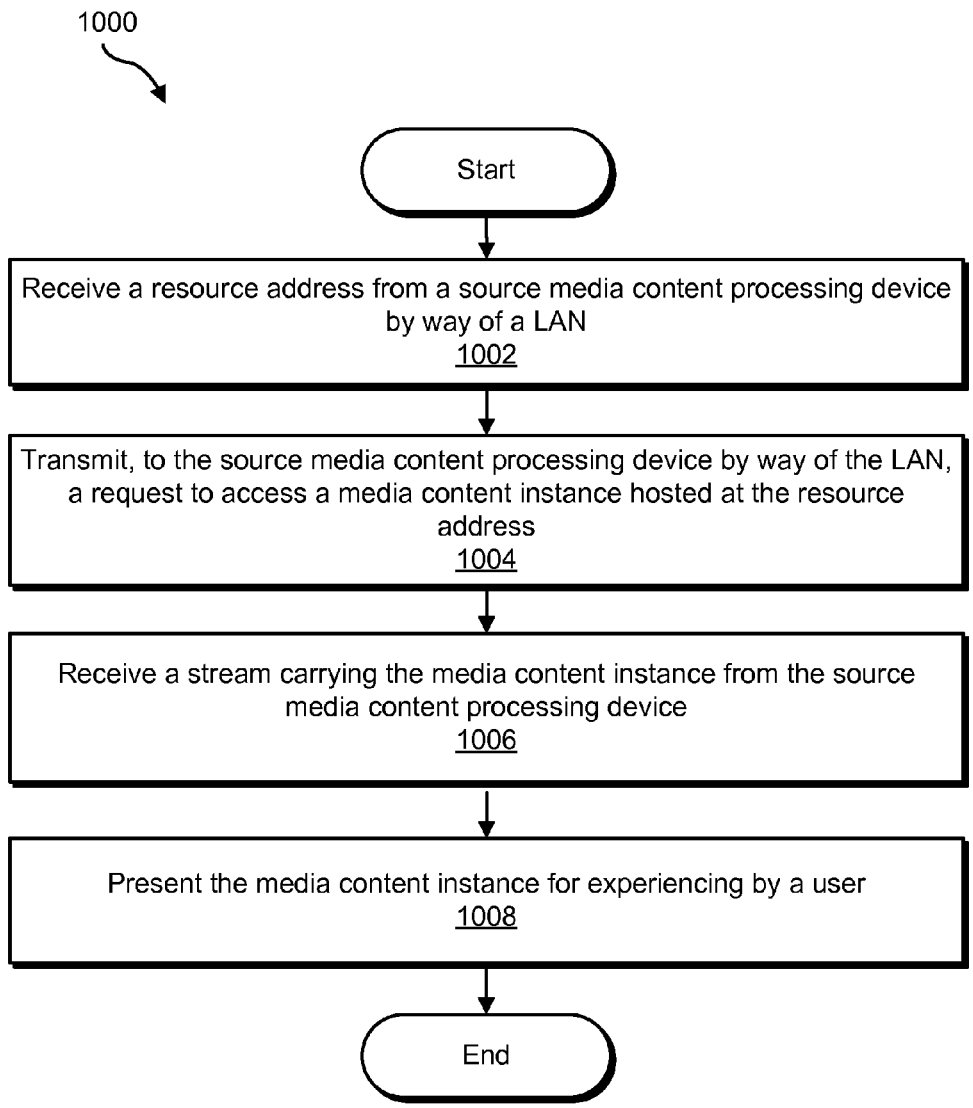

FIGS. 9-10 illustrate exemplary media flicking methods 900 and 1000. While FIGS. 9-10 illustrate exemplary steps according to certain embodiment, other embodiments may omit, add to, reorder, combine, and/or modify any of the steps shown in FIGS. 9-10. The steps shown in FIGS. 9-10 may be performed by a media content processing device 102, and/or one or more components of the media content processing device 102, functioning as a destination device.

Turning to FIG. 9, in step 902 of method 900, a destination media content processing device receives a device discovery request message from another media content processing device by way of LAN 104. The device discovery request message may be transmitted and received in any of the ways described herein.

In step 904, the destination media content processing device transmits device discovery data to the requesting media content processing device by way of LAN 104. Step 904 may be performed in response to the device discovery request message received in step 902. For example, after receiving and detecting the device discovery request message, the destination media content processing device may identify and transmit device discovery data descriptive of the destination media content processing device and/or one or more media processing capabilities of the destination media content processing device to the requesting media content processing device by way of LAN 104.

Turning to FIG. 10, in step 1002 of method 1000, a destination media content processing device receives a resource address from a source media content processing device by way of LAN 104. The resource address may be transmitted and received in any of the ways described herein.

Media flick facility 308 implemented by the destination media content processing device may detect the transmission of the resource address from the source media content processing device and determine that the resource address is associated with a request to flick media content to the destination media content processing device by way of the resource address.

In certain examples, media flick facility 308 may be configured to direct the destination media content processing device to provide a notification of the flick request to a user of the destination media content processing device. For example, a notification may be displayed in a GUI to notify the user that a request to flick media content to the destination media content processing device has been received. The notification may provide the user with one or more selectable options related to the flick request, including an option to initiate the flicking of the media content to the destination media content processing device. In response to a user selection of this option, the destination media content processing device may attempt to access the media content being flicked by way of the resource address.

In step 1004, the destination media content processing device transmits, to the source media content processing device by way of LAN 104, a request to access the media content instance hosted at the resource address. The access request may be in any suitable form and may be transmitted using any suitable communication technologies. As mentioned, in certain embodiments, the resource address may include an HTTP URL address, and the access request may include a request to access an HTTP resource hosted by the source media content processing device by way of the HTTP URL address.

In step 1006, the destination media content processing device receives a stream carrying the media content instance from the source media content processing device by way of LAN 104. For example, the source media content processing device may receive the access request transmitted in step 1004 and may respond by streaming the media content instance to the destination media content processing device by way of LAN 104, such that the destination media content processing device receives the stream in step 1006.

In step 1008, the destination media content processing device presents the media content instance for experiencing by a user. For example, the destination media content processing device may display, play back, and/or otherwise process the media content instance for presentation to the user.

Figure 11:
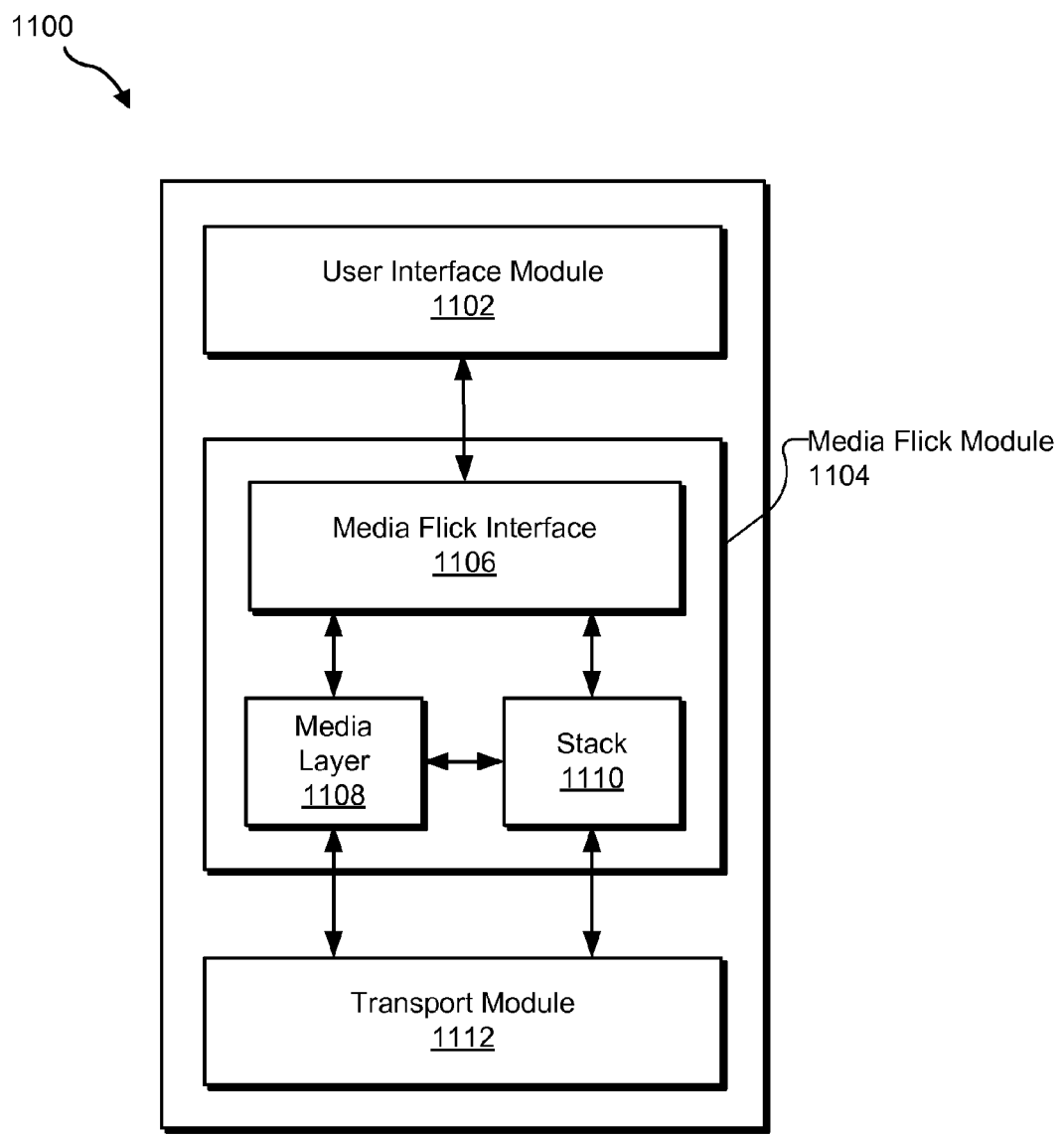
FIGS. 11-12 illustrate exemplary media content flicking system architectures according to principles described herein.

FIG. 11 illustrates an exemplary media content flicking system architecture 1100 ("architecture 1100"). Architecture 1100 may be implemented by media flicking facility 308 and/or media content processing device 102 in certain embodiments. Architecture 1100 may include a user interface module 1102, a media flick module 1104 containing a media flick interface 1106, media content 1108, and a stack 1110, and a transport module 1112 communicatively coupled as shown in FIG. 11.

User interface module 1102 may be configured to function as a layer between a user of a media content processing device 102 and media flick module 1104. For example, user interface module 1102 may be configured to detect, from user input provided by a user through I/O facility 306, a media content flick request and to forward the media content flick request to media flick interface 1106 for processing by media flick module 1104. As another example, user interface module 1102 may receive, from media flick interface 1106, output generated by media flick module 1104 and present the output to a user of the media content processing device 102.

Media flick interface 1106 may be configured to function as an interface between media flick module 1104 and user interface module 1102. When the media content processing device 102 is functioning as a source device, media flick interface 1106 may be configured to receive a media content flick request from user interface module 1102. When the media content processing device 102 is functioning as a destination device, media flick interface 1106 may be configured to provide user output generated by media flick module 1104 to user interface module 1102.

Media layer 1108 may be configured to function as a layer that provides media flick module 1104 access to media content available in the media content processing device 102. For example, media layer 1108 may provide media flick module 1104 access to media content data 312 stored by the media content processing device 102.

Stack 1110 may be configured for use in processing and communicating media content between endpoint media content processing devices. When the media content processing device 102 is functioning as a source endpoint device, stack 1110 may provide media flick data packets generated by media flick module 1104 to transport module 1112 for transport to a destination endpoint device. When the media content processing device 102 is functioning as a destination endpoint device, stack 1110 may process media flick data packets received from transport module 1112.

Transport module 1112 may be configured to function as a transport layer through which endpoint media content processing devices may communicate one with another in relation to flicking media content between devices. To this end, transport module 1112 may be configured to provide a local area network communication channel between endpoint media content processing devices.

Transport module 1112 may be configured to use any suitable media content transport and/or communication protocols for communications and/or data transfers between endpoint media content processing devices. In certain exemplary embodiments, for example, transport module 1112 is configured to use Stream Environment Transport Protocol ("SETP") for communications between media content processing devices. SETP may be used to transfer media content between endpoint devices and/or to discover media content processing devices connected to LAN 104 and/or media processing capabilities of such devices before data transfer occurs, as described herein.

Figure 12:
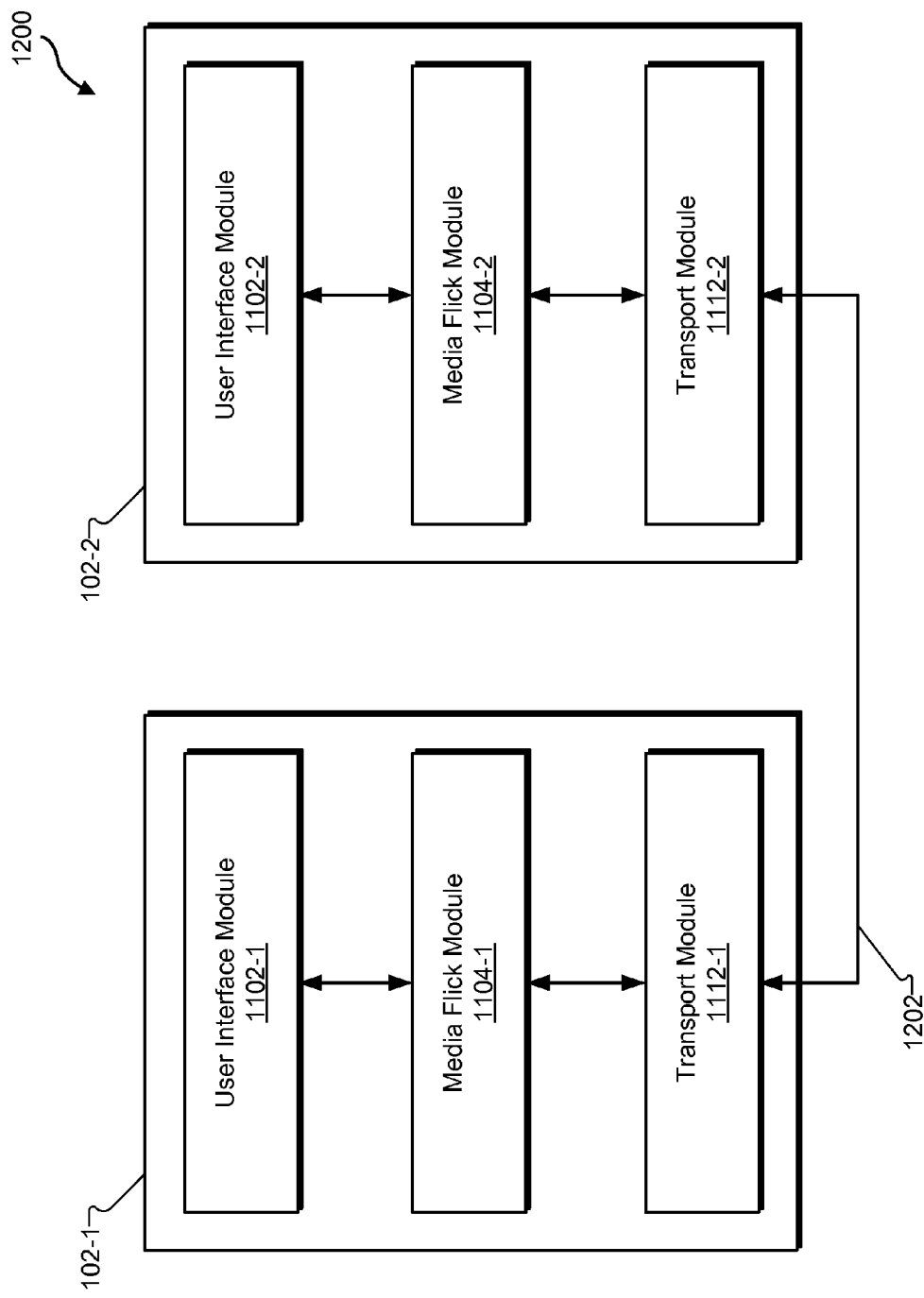

FIG. 12 illustrates an exemplary media content flicking system architecture 1200 ("architecture 1200") in which architecture 1100 is implemented by each endpoint media content processing device 102-1 and 102-2 in a pair of endpoint media content processing devices 102. As shown, media content processing device 102-1 may implement a first instance of architecture 1100 that includes user interface module 1102-1, media flick module 1104-1, and transport module 1112-1, and media content processing device 102-2 may implement a second instance of architecture 1100 that includes user interface module 1102-2, media flick module 1104-2, and transport module 1112-2. Transport modules 1112-1 and 1112-2 may form a communication channel 1202 over which endpoint devices 102-1 and 102-2 may communicate and/or transfer data related to flicking media content between the devices 102-1 and 102-2 by way of LAN 104.

Media flick module 1104 may define and/or operate in accordance with a media flick processing device protocol ("MFPDP") that defines specific messages and/or commands to be used to flick media content between locally interconnected media content processing devices. In certain examples, the MFPDP messages and/or commands may leverage and/or operate on top of SETP. An exemplary set of messages and/or commands defined by the MFPDP for flicking media content between devices will now be described.

The MFPDP may define a register command that may be used to register a user interface callback interface with media flick module 1104. The callback interface may be used for sending all callback events to a layer registered for the callback events. The register command may be used to initialize stack 1110. The MFPDP may further define a register response command that may be used to respond to a register command to indicate whether registration failed or succeeded.

The MFPDP may define an unregister command that may be used to unregister the user interface with media flick module 1104. A middleware cleanup may be performed after the unregister command is called. The MFPDP may further define an unregister response command that may be used to respond to an unregister command to indicate whether unregistration failed or succeeded.

The MFPDP may define a connectivity check command that may be used to check connectivity to LAN 104. The MFPDP may further define a connectivity response command that may be used to respond to a connectivity check command to indicate whether there is connectivity to LAN 104.

The MFPDP may define a command to determine whether a connected device is appropriately configured for media flicking as described herein (whether the device is configured to use the MFPDP to communicate, is configured to process media content, etc.). The MFPDP may further define a response command that may be used to respond to indicate whether a device is appropriately configured for media flicking as described herein.

The MFPDP may define a discovery command that may be used to obtain a list of media content processing devices connected to LAN 104 and configured for media flicking as described herein. In certain embodiments, the discovery command may be sent to a SETP layer at which layer the command is broadcast to all connected SETP configured devices connected to LAN 104. The SETP layer may then receive responses from all SETP devices connected to LAN 104. The SETP layer may accumulate the list of media content processing devices and provide the list to the MFPDP layer. The MFPDP may further define a discovery response command that may be used to respond to a discovery command to provide the list of media content processing devices connected to LAN 104 and configured for media flicking as described herein.

The MFPDP may define a compatibility command that may be used to obtain a list of media content (e.g., media content types) that can be processed by a media content processing device. The MFPDP may further define a compatibility response command that may be used to respond to a compatibility command to provide the list of media content that the media content processing device is capable of processing.

The MFPDP may define a media flick command that may be used to flick media content an endpoint source media content processing device to an endpoint destination media content processing device. The command may communicate a resource address (e.g., an HTTP URL address) for a media content instance hosted in the source device to the destination device by way of LAN 104. In certain examples, the media flick command may include metadata and/or other details of the media content instance that is hosted by the source device, which metadata and/or details may be processed (e.g., consumed, displayed, rendered, and/or played back) by the destination device. In certain embodiments, the media flick command may include a filename of the media content instance being flicked, a URL for the media content instance hosted in the source device, and a type of the media content instance being flicked.

The MFPDP may further define a media flick response command that may be used to respond to a media flick command to indicate a success or failure of the command. In certain examples in which the command failed, the media flick response command may indicate an error description descriptive of a reason for the failure. For example, if the format of the media content being flicked is not supported by the destination device, the response command may indicate that the format is not supported.

The MFPDP may define a metadata request command that may be used to obtain metadata for a media content instance.

The MFPDP may further define a metadata request response command that may be used to respond to a metadata request command to provide the requested metadata.

The MFPDP may define an event command that may be used to deliver events (e.g., media content playback control events such as commands to play, pause, resume, stop, zoom in, zoom out, start slideshow, stop slideshow, etc.) between source and destination endpoint devices.

Figure 13:
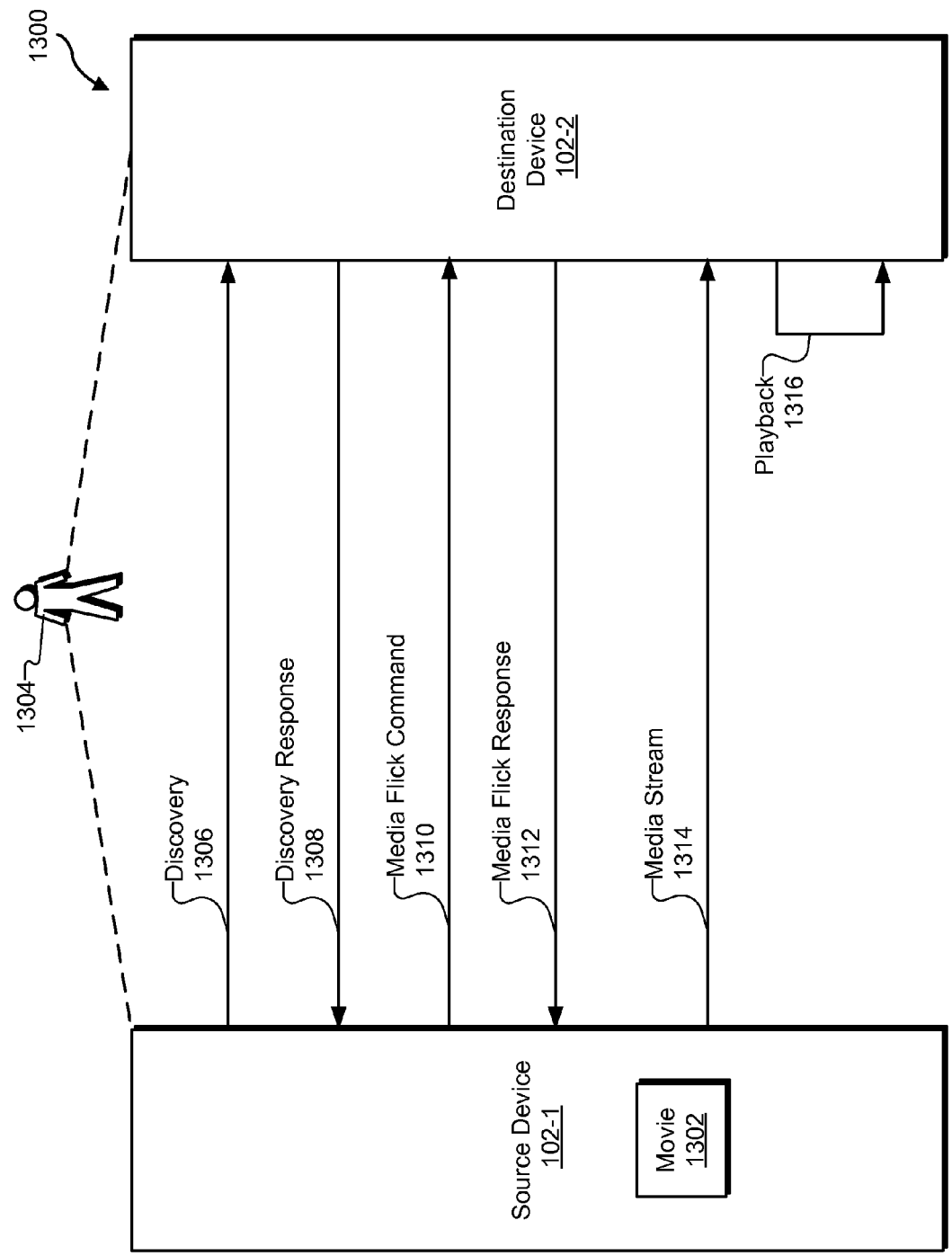
FIG. 13 illustrates an exemplary communications flow associated with flicking media content from a source device to a destination device according to principles described herein.

FIG. 13 illustrates an exemplary communications flow 1300 associated with an example of flicking a media content instance in the form of a movie 1302 from a source device 102-1 (e.g., a mobile consumer electronics device located at a customer premises) storing data representative of the movie 1302 to a destination device 102-2 (e.g., a set-top box device connected to and configured to provide media content such as the movie 1302 for playback by a television or other display device). Source device 102-1 and destination device 102-2 may be located at a customer premises (e.g., customer premises 106) associated with a user 1304, operated by user 1304, and interconnected by way of a local area network (e.g., LAN 104) at the customer premises.

Source device 102-1 may perform one or more discovery operations to request discovery data associated with destination device 102-2. The discovery operations may include source device 102-1 sending one or more discovery commands defined by the MFPDP to destination device 102-2 by way of a local area network (step 1306).

Destination device 102-2 may provide discovery data to source device 102-1 (step 1308). For example, destination device 102-2, in response to one or more discovery commands received from source device 102-1, may send one or more discovery responses to source device 102-1 by way of a local area network (step 1308). Source device 102-1 may store the discovery data.

User 1304 may want to watch the movie 1302 stored by source device 102-1 on a television connected to destination device 102-2 such that destination device 102-2 is able to provide a media output signal to the television and the television is configured to process the signal and present media content carried by the signal for experiencing by user 1304. To make this happen, user 1304 may initiate a flicking of the movie 1302 from source device 102-1 to destination device 102-2. The flicking may be accomplished in any of the ways described herein.

To illustrate, user 1304 may provide user input to source device 102-1 to indicate that the user 1304 wants to flick the movie 1302 to destination device 102-2. The user input may be provided in any suitable way, including in any of the ways described herein. In response to the user input, source device 102-1 may send a media flick command to destination device 102-2 (step 1310). For example, source device 102-1 may generate and send a media flick command defined in accordance with the MFPDP to destination device 102-2 by way of a local area network. The media flick command may include any of the information described herein, including an HTTP URL address hosted by source device 102-1 and at which the movie 1304 may be accessed by destination device 102-2 through the local area network.

Destination device 102-2 may receive, recognize, and respond to the media flick command by sending a media flick response to source device 102-1 (step 1312). The media flick response may be defined in accordance with the MFPDP and may include a request to access the movie 1302 at the HTTP URL address that was received by destination device 102-2 in the media flick command.

In response to the media flick response, source device 102-1 may generate and transmit a media stream carrying the movie 1302 to destination device 102-1 by way of a local area network (step 1314). Destination device 102-2 may receive the media stream and play back the movie 1302 (step 1316) for presentation to user 1304 by way of the television connected to destination device 102-2. In this manner, the user 1304 may select which device to use to experience media content, and the media content may be flicked from one device to the selected device for presentation to the user.

In certain embodiments, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 14:
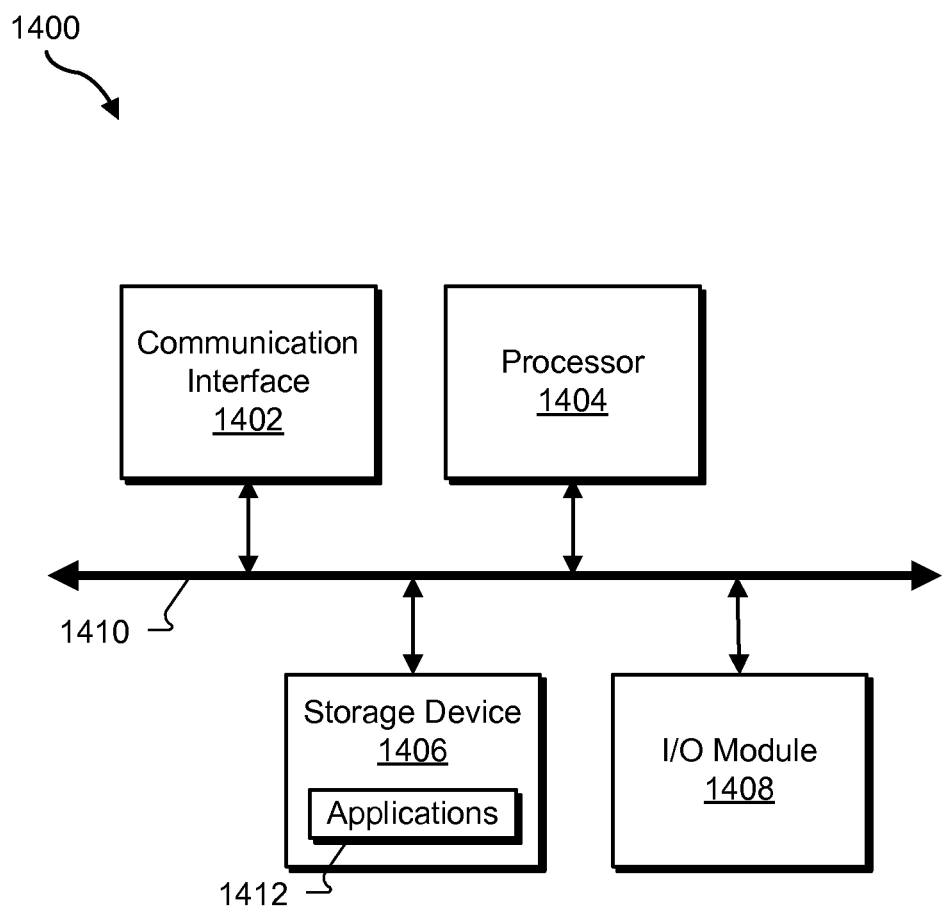
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, and any other suitable interface. Communication interface 1402 may be configured to interface with any suitable communication media, protocols, and formats, including any of those mentioned above.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 (which may include, but are not limited to, one or more of the software applications described herein) configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the features described herein may be implemented and/or performed by one or more components of computing device 1400. For example, one or more applications 1412 residing within storage device 1406 may be configured to direct processor 1404 to perform one or more processes or functions associated system 100, a media content processing device 102, and/or one or more components thereof.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a media content processing device located at a customer premises, a user request to flick a media content instance from the media content processing device to a destination media content processing device located at the customer premises, the media content processing device and the destination media content processing device located in and communicatively connected to a same local area network at the customer premises;
   in response to the detecting of the user request to flick the media content instance, a processor of the media content processing device directing the media content processing device to:
      host the media content instance at a resource address for access by way of the local area network, the resource address specific to the media content instance and specifying a pathname indicating a specific file location within a local memory of the media content processing device at which the media content instance is hosted by the media content processing device, and
      transmit data representative of the resource address to the destination media content processing device by way of the local area network;
   receiving, by the media content processing device from the destination media content processing device by way of the local area network, a request to access the media content instance at the resource address;
   streaming, by the media content processing device to the destination media content processing device by way of the local area network in response to the receiving of the request, data representative of the media content instance for processing by the destination media content processing device;
   detecting, by the media content processing device, a predetermined hosting termination event; and
   terminating, by the media content processing device in response to the detecting of the predetermined hosting termination event, the hosting of the media content instance at the resource address by deleting a mapping of the resource address to the specific file location associated with the media content instance such that the media content instance is no longer accessible through the resource address.

2. The method of claim 1, wherein the resource address comprises a Hypertext Transfer Protocol ("HTTP") Uniform Resource Locator ("URL").

3. The method of claim 1, wherein the streaming comprises Hypertext Transfer Protocol ("HTTP") streaming over the local area network.

4. The method of claim 1, wherein the local area network comprises a Wi-Fi network.

5. The method of claim 1, wherein the media content processing device and the destination media content processing device are configured to use a Stream Environment Transport Protocol ("SETP") to communicate with one another by way of the local area network.

6. The method of claim 5, wherein the media content processing device and the destination media content processing device are configured to use a defined media flick processing device protocol on top of the SETP to communicate with one another by way of the local area network.

7. The method of claim 1, further comprising:
   discovering, by the media content processing device, one or more other media content processing devices connected to the local area network, the destination media content processing device included in the one or more other media content processing devices discovered by the media content processing device; and
   maintaining, by the media content processing device, discovery data representative of the one or more other media content processing devices discovered by the media content processing device.

8. The method of claim 7, wherein the detecting comprises:
   receiving, by the media content processing device, user input requesting that the media content instance be flicked from the media content processing device;

presenting, by the media content processing device, a graphical user interface that includes a list of the one or more other media content processing devices discovered by the media content processing device; and receiving, by the media content processing device by way of the graphical user interface, a user selection of the destination media content processing device from the list of the one or more other media content processing devices discovered by the media content processing device.

9. The method of claim 7, wherein:

the discovering comprises discovering, by the media content processing device, media processing capabilities of the one or more other media content processing devices discovered by the media content processing device; and the streaming comprises tailoring, by the media content processing device, the streaming of the data representative of the media content instance to the destination media content processing device based on at least one of the discovered media processing capabilities that is associated with the destination media content processing device.

10. The method of claim 1, further comprising:

receiving, by the destination media content processing device from the media content processing device by way of the local area network, the data representative of the resource address; and transmitting, by the destination media content processing device, the request to access the media content instance at the resource address to the media content processing device by way of the local area network.

11. The method of claim 1, further comprising:

receiving, by the destination media content processing device from the media content processing device by way of the local area network, the streaming data representative of the media content instance; and presenting, by the destination media content processing device, the media content instance for experiencing by a user.

12. The method of claim 1, wherein the media content processing device comprises a mobile consumer electronics device and the destination media content processing device comprises a set-top box device.

13. The method of claim 1, embodied as computer-executable instructions on at least one non-transitory computer-readable medium.

14. A method comprising:

detecting, by a media content processing device located at a customer premises, a user request to flick a media content instance from the media content processing device to a destination media content processing device located at the customer premises, the media content processing device and the destination media content processing device located in and communicatively connected to a same local area network at the customer premises;

in response to the detecting of the user request to flick the media content instance, a processor of the media content processing device directing the media content processing device to:

host the media content instance at a Hypertext Transfer Protocol ("HTTP") Uniform Resource Locator ("URL") address for access by way of the local area network, the HTTP URL address specific to the media content instance and specifying a pathname indicating a specific file location within a local memory of the media content processing device at which the media content instance is hosted by the media content processing device, and transmit data representative of the HTTP URL address to the destination media content processing device by way of the local area network;

receiving, by the media content processing device from the destination media content processing device by way of the local area network, a request to access the media content instance at the HTTP URL address;

streaming, by the media content processing device to the destination media content processing device by way of the local area network in response to the receiving of the request, data representative of the media content instance for processing by the destination media content processing device;

detecting, by the media content processing device, a predetermined hosting termination event; and terminating, by the media content processing device in response to the detecting of the predetermined hosting termination event, the hosting of the media content instance at the resource address by deleting a mapping of the resource address to the specific file location associated with the media content instance such that the media content instance is no longer accessible through the resource address.

15. The method of claim 14, wherein:

the media content processing device comprises a mobile consumer electronics device;

the destination media content processing device comprises a set-top box device configured to provide a media output signal to a television; and the local area network comprises a home W-Fi network.

16. The method of claim 14, embodied as computer-executable instructions on at least one non-transitory computer-readable medium.

17. A system comprising:

a user interface module implemented by a media content processing device and configured to detect a user request to flick a media content instance from the media content processing device to a destination media content processing device, the media content processing device and the destination media content processing device located in and communicatively connected to a same local area network at a customer premises; and a media flick module implemented by the media content processing device and communicatively coupled to the user interface module, the media flick module configured to respond to the user request to flick the media content instance from the media content processing device to the destination media content processing device by directing a processor of the media content processing device to direct the media content processing device to:

host the media content instance at a resource address for access by way of the local area network, the resource address specific to the media content instance and specifying a pathname indicating a specific file location within a local memory of the media content processing device at which the media content instance is hosted by the media content processing device, and transmit data representative of the resource address to the destination media content processing device by way of the local area network;

wherein the media content processing device detects a predetermined hosting termination event and, in response to the detecting of the predetermined hosting termination event, terminates the hosting of the media content instance at the resource address by deleting a mapping of the resource address to the specific file location associated with the media content instance such that the media content instance is no longer accessible through the resource address.

18. The system of claim 17, further comprising a transport module implemented by the media content processing device and communicatively coupled to the media flick module, the transport module configured to:
   receive, from the destination media content processing device by way of the local area network, a request to access the media content instance at the resource address, and
   stream, to the destination media content processing device in response to the access request, data representative of the media content instance for processing by the destination media content processing device.

19. The system of claim 17, wherein:
   the resource address comprises a Hypertext Transfer Protocol ("HTTP") Uniform Resource Locator ("URL"); and
   the transport module is configured to use HTTP streaming to stream the data representative of the media content instance over the local area network.

20. The system of claim 17, wherein:
   the local area network comprises a Wi-Fi network at the customer premises;
   the media content processing device comprises a mobile consumer electronics device located at the customer premises and storing data representative of the media content instance; and
   the destination media content processing device comprises a set-top box device located at the customer premises.

21. The method of claim 1, wherein the receiving of the request to access the media content instance at the resource address occurs after the detecting of the user request to flick the media content instance from the media content processing device to the destination media content processing device located at the customer premises.

22. The method of claim 1, wherein the predetermined hosting termination event comprises one of a completion of the streaming of the data representative of the media content instance and the destination media content processing device terminating the streaming of the data representative of the media content instance.

* * * * *